(12) United States Patent
Marcel

(10) Patent No.: US 11,378,118 B2
(45) Date of Patent: Jul. 5, 2022

(54) FENCING PIN ANCHOR

(71) Applicant: Newpark Mats & Integrated Services LLC, The Woodlands, TX (US)

(72) Inventor: Adam Marcel, Youngsville, LA (US)

(73) Assignee: NEWPARK MATS & INTEGRATED SERVICES LLC, The Woodlands, TX (US)

( * ) Notice: Subject to any disclaimer, the term of this patent is extended or adjusted under 35 U.S.C. 154(b) by 141 days.

(21) Appl. No.: 16/939,320

(22) Filed: Jul. 27, 2020

(65) Prior Publication Data
US 2021/0040974 A1    Feb. 11, 2021

Related U.S. Application Data

(60) Provisional application No. 62/882,944, filed on Aug. 5, 2019.

(51) Int. Cl.
| | |
|---|---|
| *F16B 21/02* | (2006.01) |
| *F16B 5/02* | (2006.01) |
| *B29C 65/00* | (2006.01) |
| *B29C 65/56* | (2006.01) |

(52) U.S. Cl.
CPC ............ *F16B 21/02* (2013.01); *B29C 65/562* (2013.01); *B29C 66/1122* (2013.01); *F16B 5/02* (2013.01)

(58) Field of Classification Search
CPC ..... F16B 21/02; B29C 66/1122; B29C 66/21; B29C 66/43; B29C 66/1282; B29C 66/12841; B29C 66/12861; B29C 66/14
See application file for complete search history.

(56) References Cited

U.S. PATENT DOCUMENTS

| | | | |
|---|---|---|---|
| 6,722,831 B2 * | 4/2004 | Rogers | .................... F16B 21/02 411/553 |
| 9,068,584 B2 | 6/2015 | McDowell et al. | |

* cited by examiner

*Primary Examiner* — Jason L Vaughan
*Assistant Examiner* — Amanda Kreiling
(74) *Attorney, Agent, or Firm* — Cantor Colburn LLP

(57) ABSTRACT

One aspect is a system for securing an external structure to overlapping surfaces. The system includes a housing having a bore extending from a first surface of the housing to an opposite surface of the housing. The system further includes a rotor that has an inner bore and is arranged radially inward from the housing bore. An extending member is attached to the rotor and arranged radially inward from the inner bore. Additionally, a fastener member is engaged with the extending member.

20 Claims, 7 Drawing Sheets

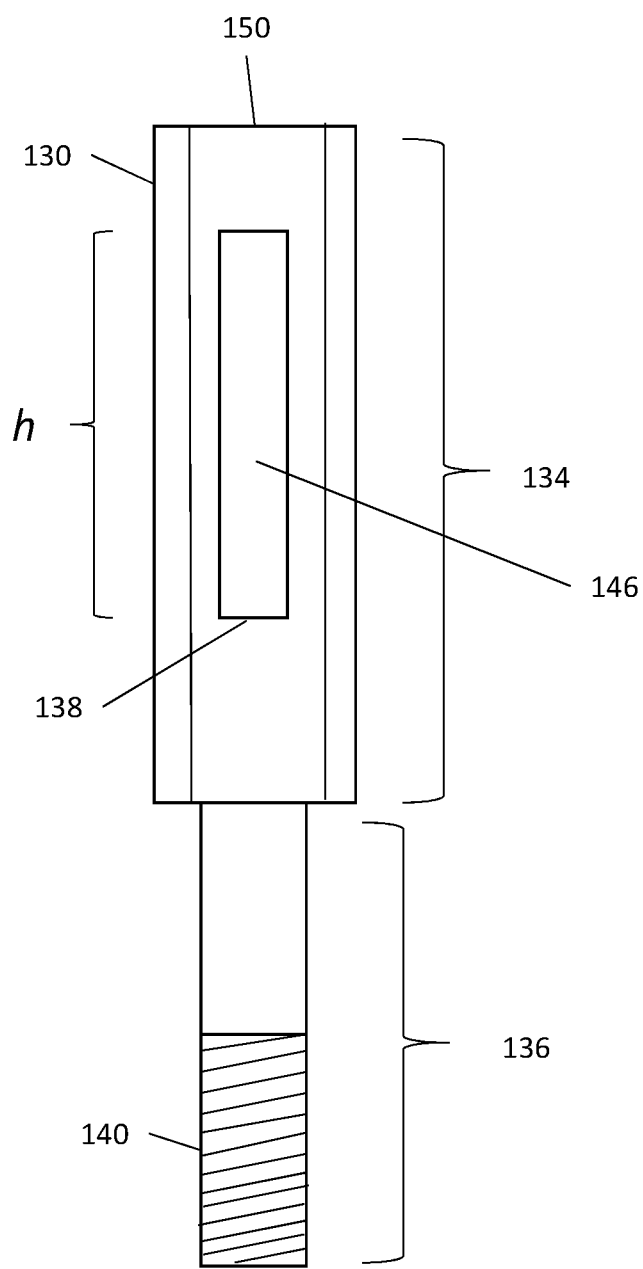
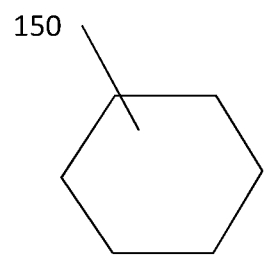
FIG. 2A
FIG. 2B

FENCING PIN ANCHOR

CROSS REFERENCE TO RELATED APPLICATIONS

This application claims the benefit of an earlier filing date from U.S. Provisional Application Ser. No. 62/882,944, filed Aug. 5, 2019, the entire disclosure of which is incorporated herein by reference.

BACKGROUND OF THE DISCLOSURE

Embodiments of the invention generally relate to a modular support connecting apparatus, and more particularly, to a fencing pin anchor.

Temporary surfaces are employed over various earthen and manufactured surfaces to provide stable and planar support. In addition, temporary and permanent structures and equipment are positioned on and around the temporary surfaces. In some instances, the nature of the structure or equipment calls for stability and restriction of motion. To maintain an ease of operation, systems and methods for securing the additional structures should be readily integrable with the temporary surfaces and provide adequate support.

Therefore, a need exists for a mechanism that supports the stability of additional surface structures on a surface.

BRIEF DESCRIPTION OF THE DISCLOSURE

According to one embodiment, a system for securing an external structure to overlapping surfaces includes a housing having a bore extending from a first surface of the housing to an opposite surface of the housing. The system further includes a rotor having an inner bore that is arranged radially inward from the housing bore. An extending member is arranged radially inward from the inner bore and the first surface. Additionally, a fastener member is engaged with the extending member for securing an external structure.

In addition to one or more of the features described above or below, or as an alternative, further embodiments include where the housing bore is a partially threaded bore and the rotor is partially threaded, and the rotor is engaged to the housing bore through the threading.

In addition to one or more of the features described above or below, or as an alternative, further embodiments include where the rotor includes a base having a width greater than a width of the threaded portion of the rotor.

In addition to one or more of the features described above or below, or as an alternative, further embodiments include where the rotor has a head having a width greater than a width of the threaded portion of the rotor.

In addition to one or more of the features described above or below, or as an alternative, further embodiments include a sealing member arranged on a surface of the housing.

In addition to one or more of the features described above or below, or as an alternative, further embodiments include where the sealing member comprises an elastomeric material.

In addition to one or more of the features described above or below, or as an alternative, further embodiments include where the extending member includes an orifice extending from a first surface of the extending member to an opposite surface of the extending member.

In addition to one or more of the features described above or below, or as an alternative, further embodiments include where the fastener member is releasable from the extending member.

In addition to one or more of the features described above or below, or as an alternative, further embodiments include where the fastener member is affixed to the extending member.

In addition to one or more of the features described above or below, or as an alternative, further embodiments include where the fastener member comprises a profile having at least one surface having a length greater than a height of the orifice.

In addition to one or more of the features described above or below, or as an alternative, further embodiments include where the fastener member comprises at least one surface having a length greater than a width of the orifice such that a first portion extends away from a first opening of the orifice and a second portion extends away from a second opening of the orifice.

In addition to one or more of the features described above or below, or as an alternative, further embodiments include where the extending member comprises a fastener knob connected to a shaft.

In addition to one or more of the features described above or below, or as an alternative, further embodiments include where the fastener member comprises an orifice extending through a central surface of the fastener member, and wherein a first side surface and a second side surface respectively extend at an angle from the central surface to form a compartment.

In addition to one or more of the features described above or below, or as an alternative, further embodiments include where the first side surface is substantially parallel to the second side surface.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 2A is a first side view of an extending member in accordance with an exemplary embodiment, FIG. 2B is a plan view of an extending member in accordance with an exemplary embodiment;

The detailed description explains embodiments of the disclosure, together with advantages and features, by way of example with reference to the drawings.

DETAILED DESCRIPTION OF THE DISCLOSURE

Exemplary embodiments provide systems and methods for securing an external structure to overlapping surfaces.

Figure 1:
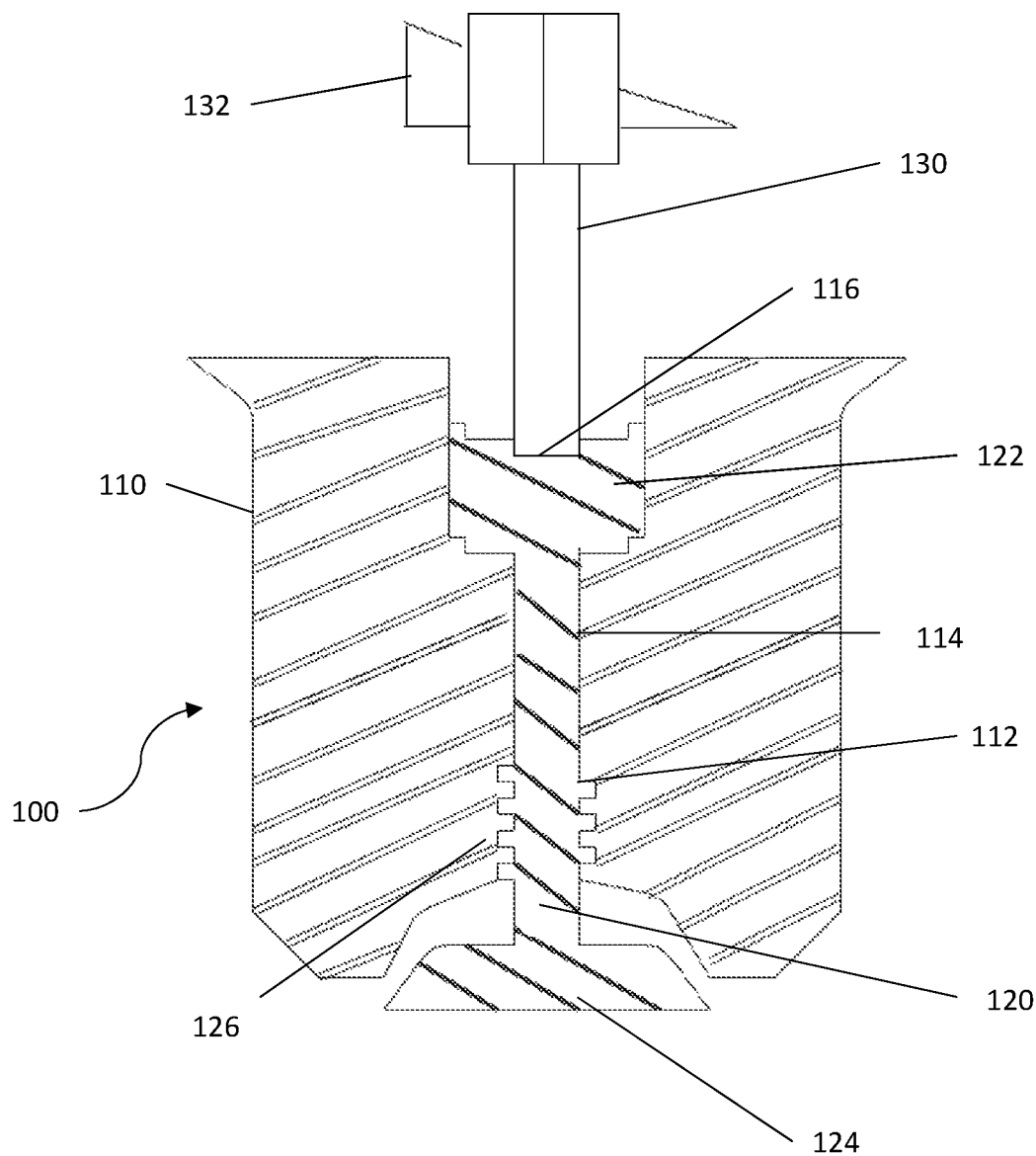
FIG. 1 is a cross-sectional view of a structure locking pin in accordance with an exemplary embodiment.
Figure 6:
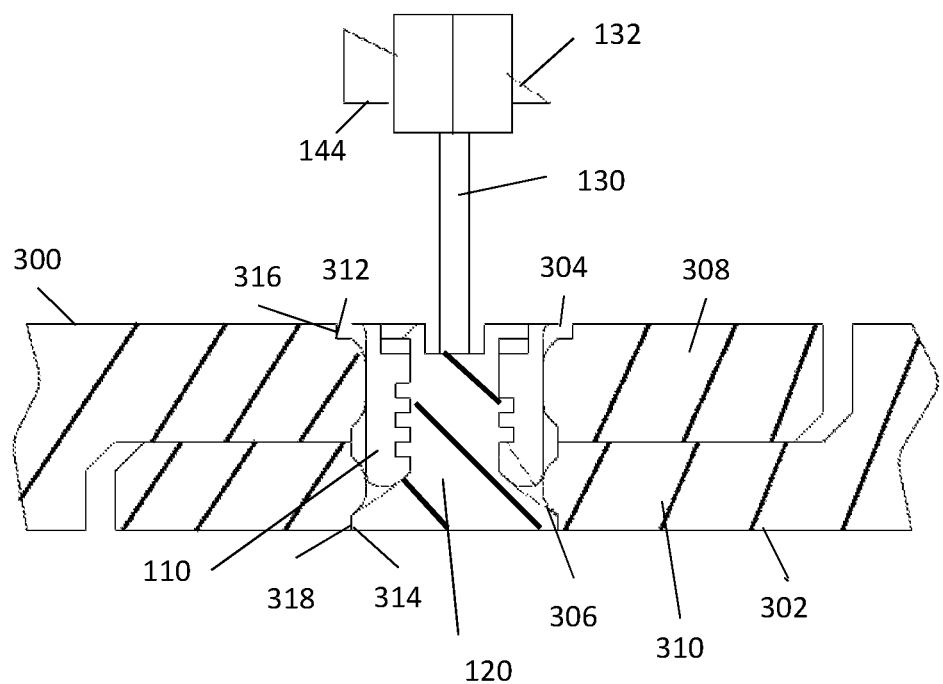
FIG. 6 is a cross-sectional view of a structure locking pin embedded into two overlapping mats in accordance with an exemplary embodiment.

With reference to FIGS. 1, 2A and 6, a cross-sectional view of a structure locking pin 100 is shown. The structure locking pin 100 includes a housing 110, a rotor 120, an extending member 130, and a fastener member 132. The extending member 130 enables the structure locking pin 100 to secure an external structure (not shown) between the fastener member 132 and the housing 110. It should be noted that the housing 110 need not be the defining end opposing the fastener member 132. Rather, it may be that the housing 110 uppermost surface is subsurface level with respect to a mat 300 uppermost surface. The external structure could be sandwiched between the mat 300 upper surface and the fastener member 132.

The rotor 120 includes a head 122 and a threaded portion 112 for mating with a threaded portion 126 of a bore 114 of the housing 110. Additionally, the rotor 120 includes an inner bore (not shown) for receiving the extending member 130 at an opening 116 on a surface of the head 122. The inner bore includes a threaded portion (not shown) for mating with the threaded portion 140 of the extending member 130. The width of the head 122 is greater than a width of the threaded portion 140. The rotor 120 also includes at least one base 124. It should be appreciated that the base 124 may have any appropriate form. For example, the base 124 can be generally oblong, or asymmetrical, and extends outwardly of the outer profile of the other parts of the rotor 120.

The base 124 is rotatable between at least two positions relative to the housing 110 as the rotor 120 is rotated. In at least a first position, the base 124 lies generally within a profile of the housing 110. In the instance that the structure locking pin 100 is inserted into the mats 300, 302, the base 124 is substantially in line with the respective connecting holes 304, 306 of the mats 300, 302 and in an unlocked position. A length of the rotor 120 extends in a direction from the base 124 to the head 122. A width of the base 124 is greater than a width of the threaded portion 140 and secures the rotor 120 to the mats 300, 302. In some embodiments, the width of the base 124 is greater than the width of the head 122.

In at least a second position, the base 124 extends at an angle from the profile of the housing 110. In the instance that the structure locking pin 100 is inserted into the mats 300, 302, the base 124 is substantially out of line with the connecting holes 304, 306 of the mats 300, 302 and in a locked position. The base 124 is thus configured to rotate under the second mat 302 and secure the mats 300, 302 together.

The structure locking pin 100 may also include one or more sealing members (not shown) extending around the periphery of the surface of the housing 110. In these embodiments, as the rotor 120 is rotated, the base 124 effectively compresses the sealing member against the first mat 300 as it tightens the first mat 300 and the second mat 302 together. The sealing member includes an opening to permit the extending member 130 to pass through.

It should be appreciated that the sealing member includes any appropriate form, configuration and operation. In some embodiments, the sealing member is an elastomeric seal operable to form an at least substantially fluid-tight seal between the housing 110 and a first indentation 312 of the first mat 300, such as to prevent the entry of debris and/or fluid into the first connecting hole 304 of the first mat 300. As the structure locking pin 100 is tightened in place, the sealing member presses between the housing 110 and a rim 316 to form a substantially fluid tight seal around the first connecting hole 304.

To secure an external structure to the mats 300, 302, the structure can be placed on a surface of the housing 110 or on a surface of the mats. The extending member 130 is inserted into the opening 116 and secured in the inner bore of the rotor 120. In some embodiments, the external structure has an opening that allows the extending member 130 to extend through opening of the external structure. In this instance, the structure at least partially surrounds the shaft of the extending member 130 and is engaged with and secured by the fastener member 132. In other embodiments, the external structure does not include an opening and is positioned under the fastener member 132 to also be engaged with and secured by the engaging surface 144 of a fastener member 132.

With reference to FIGS. 2A, 2B, 3A, and 3B, an extending member 130 is shown according to an exemplary embodiment. The extending member 130 includes a first part 134 connected to a second part 136. The first part 134 includes an orifice 138 and the second part 136 includes a shaft connected to the first part 134 at one end and a threaded portion 140 at the opposite end. Additionally, a fastener member 132 is insertable into the orifice 138.

As seen FIG. 2A, the first part 134 includes an orifice 138 that forms a tunnel 146 through the first part 134. The fastener member 132 is insertable through this tunnel 146 as seen in FIG. 3B. The dimensions of the orifice 138 are sufficient to permit the fastener member 132 to be inserted into the tunnel 146. In some embodiments, a height h of the orifice is less than a height h' of a surface of the fastener member 132.

In some embodiments, the first part 134 includes a surface 150 made of flat surfaces forming a geometric shape. For example, as seen in FIG. 2B, the radial surface of the first part 134 is made of six flat surfaces of equal width, such that a hexagon is formed at a surface 150 of the extending member 130. In other embodiments, the radial surface of the first part 134 is rounded.

Figure 3A:
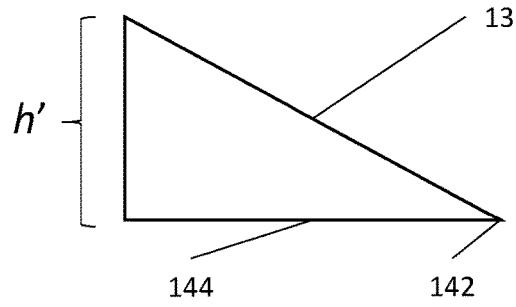
FIG. 3A is a side view of a pin wedge in accordance with an exemplary embodiment.
Figure 3B:
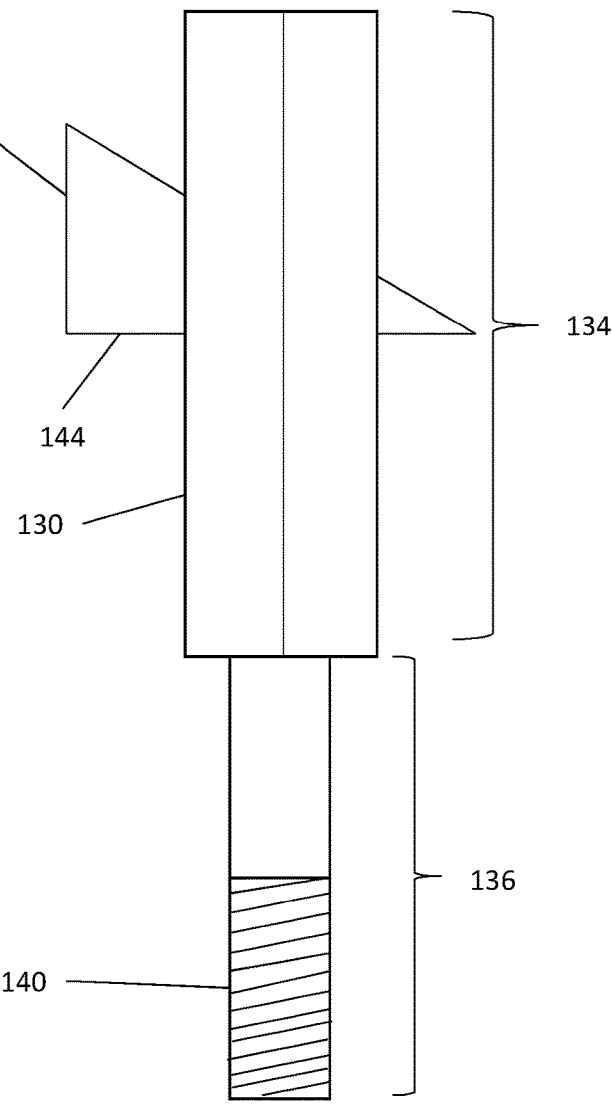
FIG. 3B is a side view of a pin wedge inserted into an extending member in accordance with an exemplary embodiment.

An exemplary embodiment of a fastener member 132 is seen in FIGS. 3A and 3B. In some embodiments, the fastener member 132 is releasable from the extending member 130. In other embodiments, the fastener member 132 is permanently affixed to the extending member 130. It should be appreciated that the fastener member 132 includes any suitable profile, for example a triangle. A triangle includes a scalene, isosceles, or equilateral form. The fastener member 132 includes an insertion angle 142 for inserting in an opening of the orifice 138. As described above, the dimensions of the fastener member 132 are such that a first portion extends in a first direction from an opening of the orifice 138 and a second portion extends in a second direction from an opposite opening of the orifice 138. A side of the fastener member 132 has a height greater than a height of the orifice 138. Therefore, as the insertion angle 142 is inserted into the orifice 138, the fastener member 132 can continue to be pushed through the orifice 138 until the height of the fastener member 132 is equal to the height of the orifice 138. An engaging surface 144 of the fastener member 132 extends in a substantially perpendicular direction from the extending member 130. The fastener member 132 is fabricated from metal, plastic, or other appropriate material. In operation, an external structure is arranged on a surface of a first mat 300 or the housing 110 relative to the extending member 130. To secure the external structure, a fastener member 132 is pressed into the orifice 132 of the extending member 130. The fastener member 132 can be pressed manually or with the use of a tool. The pressed fastener member 132 engages with both a surface of an external structure and a surface of the tunnel 146 of the orifice 138. A force caused by the fastener member 132 on the external structure results in a reaction force wedging the fastener member 132 against the tunnel 146 of the orifice 138, thereby causing the external structure to be secured on the surface of the first mat 300 or the housing 110.

Figure 4A:
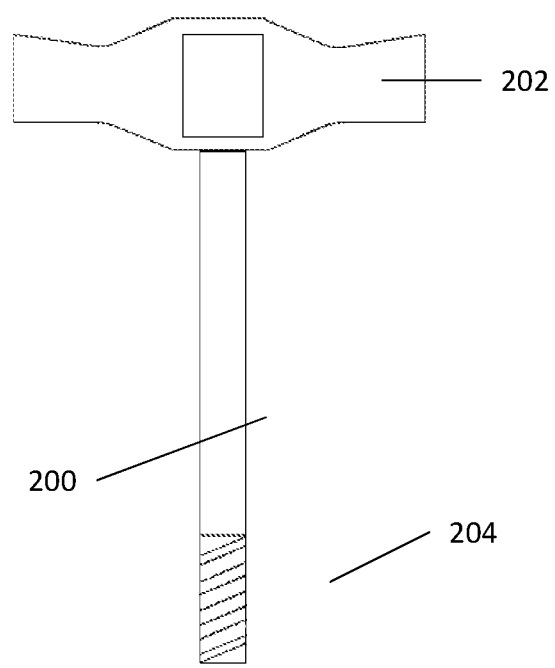
FIG. 4A is a side view of an extending member in accordance with an exemplary embodiment.
Figure 4B:
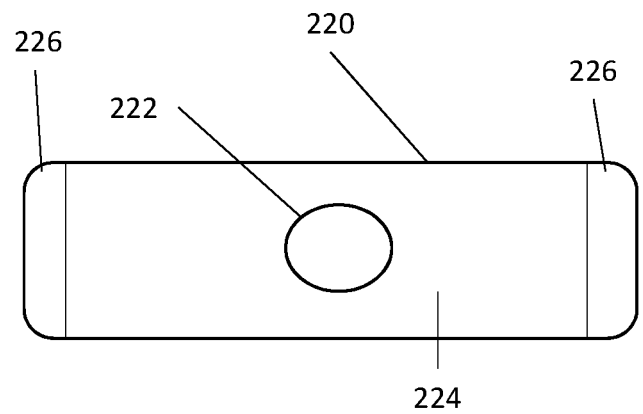
FIG. 4B is a plan view of a fastening member in accordance with an exemplary embodiment, and FIG. 4C a side view of a fastening member in accordance with an exemplary embodiment.
Figure 4C:
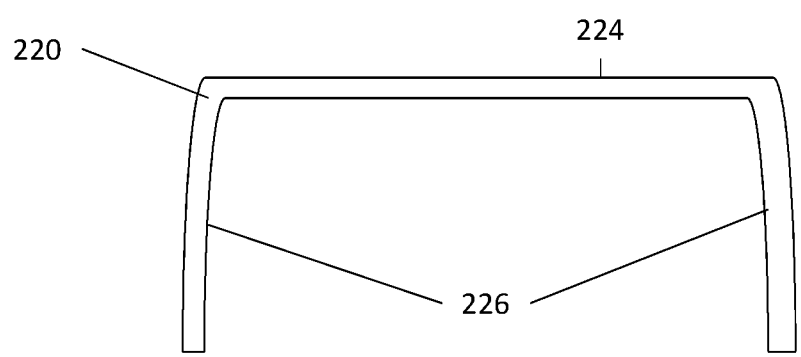
Figure 5:
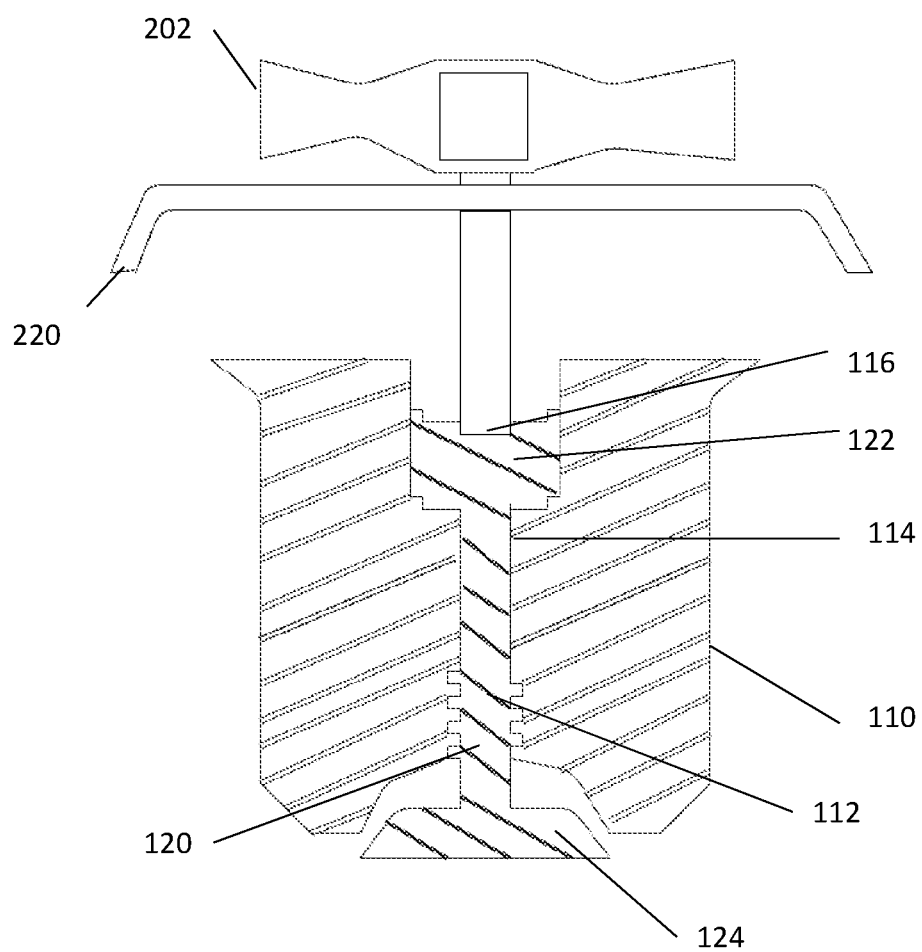
FIG. 5 is a cross-sectional view of a structure locking pin in accordance with an exemplary embodiment.

Referring to FIGS. 4A, 4B, 4C, and 5, another exemplary embodiment of an extending member 200 and a plan view and a side view of a fastener member 220 are shown. The extending member 200 includes a fastener knob 202 connected to a shaft having a threaded portion 204. The threaded portion 204 enables the extending member 200 to mate with the inner bore of the rotor 120. The fastener knob 202 includes, but is not limited to, a multiple armed knob, a thumb screw knob, a rounded knob. A plan view and a side view of the fastener member 220 are shown in FIG. 4B. The fastener member 220 includes an orifice 222 at a central portion 224 and extending through fastener member 220. A width of the orifice 222 is larger than a width of the shaft of the extending member 200. The fastener member 220 has a profiled surface operable to engage an external structure. In some embodiments, the side portions 226 of the fastener member 220 extend in a substantially similar direction from the central portion 224 and form a compartment. The shaft of the extending member 200 can be inserted through the orifice 222 and the threaded portion 204 can mate with the inner bore of the rotor 120.

In operation, the fastener member 220 is engaged to a surface of a structure that is opposite of a surface of the structure that is engaged to the housing 110. The side portions 226 extend towards the first mat 300 and the second mat 302 and partially surround at least a part of the structure. In some embodiments, a width of the central portion 224 spans a width of the partially surrounded portion of the structure. The side portions 226 begin to curve in a direction toward the mats at a respective edge of the partially surrounded portion. In this sense, the fastener member 220 secures a structure to the first mat 300 and the second mat 302 at the central portion 224 and each side portion 226. In some embodiments, the side portions 226 are substantially parallel to each other. In other embodiments, the side portions 226 extend at an angle towards the mats and form a trapezoidal profile with the central portion 224. The angles of the side portions 226 in relation to the central portion 224 allow the compartment to surround structures having different surface profiles. The width of the central portion 224 and the angle of side portions 226 can be modified to either cause at least one side portion 226 of directly contact the structure or provide a distance between the at least one side portion 226 and the structure.

An illustrative example of the structure locking pin 100 is provided in FIG. 6, a first mat 300 is engaged with a second mat 302 such that a first connecting hole 304 in a first lip 308 of the first mat 300 is aligned over a second connecting hole 306 in a second lip 310 of the second mat 302. The surfaces of the lips 308, 310 respectively include an indentation 312, 314 extending around each respective connecting hole 304, 306. In some embodiments, a surface of the first lip 308 of the first mat 300 includes a first indentation 312 extending around the first connecting hole 304, and a surface of the lip 310 of the second mat 302 also includes a second indentation 314 formed around the second connecting hole 306. The indentations 312, 314 respectively include a rim 316, 318 that has a curved outer surface, thereby forming a circular arc or radius. The first mat 300 and the second mat 302 are substantially identical and arranged conversely to each other.

The extending member 130 generally extends perpendicularly from the first mat 300 and the second mat 302, and consequently substantially perpendicular to the surface that the mats lie upon. An external structure, for example, a fencing, can be positioned between the first mat 300 and the engaging surface 144 of the fastener member 132. As the fastener member 132 is secured into the inner bore of the rotor 120, the engaging surface 144 of the fastener member 132 and a surface of the first mat 300 clamp the external structure into a secure position.

The terms "about" and "substantially" are intended to include the degree of error (up to 10%) associated with measurement of the particular quantity or characterization based upon the equipment available at the time of filing the application.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A system for securing an external structure to overlapping surfaces, the system comprising:
   a housing having a bore extending from a first surface of the housing to a second surface of the housing;
   a rotor having an inner bore and being arranged radially inward from the housing bore;
   an extending member having a portion arranged radially inward from the inner bore; and
   a fastener member engaged with the extending member.

2. The system of claim 1, wherein the housing bore comprises a threaded portion and the rotor comprises a threaded portion, and wherein the threaded portion of the rotor is engaged to the threaded portion of the housing bore.

3. The system of claim 1, wherein the inner bore comprises a threaded portion and the extending member comprises a threaded portion, and wherein the threaded portion of the inner bore is engaged to the threaded portion of the extending member.

4. The system of claim 3, wherein the rotor comprises a base having a width greater than a width of the threaded portion of the inner bore.

5. The system of claim 3, wherein the rotor comprises a head having a width greater than a width of the threaded portion of the inner bore.

6. The system of claim 1 further comprising a sealing member arranged on a surface of the housing.

7. The system of claim 6, wherein the sealing member comprises an elastomeric material.

8. The system of claim 1, wherein the extending member comprises an orifice extending from a first surface of the extending member to a second surface of the extending member.

9. The system of claim 8, wherein each opening of the orifice comprises a rectangular profile.

10. The system of claim 1, wherein the fastener member is releasable from the extending member.

11. The system of claim 1, wherein the fastener member is affixed to the extending member.

12. The system of claim 8, wherein the fastener member comprises a profile having at least one surface having a length greater than a height of the orifice.

13. The system of claim 8, wherein the fastener member comprises at least one surface having a length greater than a width of the orifice.

14. The system of claim 1, wherein the extending member comprises a fastener knob connected to a shaft.

15. The system of claim 14, wherein the fastener member comprises an orifice extending through a central portion of the fastener member, and wherein a first side surface and a second side surface respectively extend at an angle from the central portion to form a compartment.

16. The system of claim 15, wherein the first side surface is substantially parallel to the second side surface.

17. A method for securing an external structure to overlapping surfaces, the method comprising:
inserting a housing and a rotor into a first hole of a first mat that overlaps a second hole of a second mat;
inserting an extending member into an inner bore of the rotor;
arranging an external structure relative to the extending member;
engaging the extending member to cause the rotor to rotate relative to the housing; and
engaging the external structure with a fastening member.

18. The method of claim 17 further comprising:
arranging a sealing member on a surface of the housing.

19. The method of claim 17, wherein the fastening member is engaged to the extending member prior to the extending member being inserted into the inner bore.

20. The method of claim 17, wherein the fastening member is engaged to the extending member after the extending member is inserted into the inner bore.

* * * * *